United States Patent [19]
Ohde et al.

[11] Patent Number: 5,629,939
[45] Date of Patent: May 13, 1997

[54] TIME SLOT REARRANGING APPARATUS IN MULTIPLEXER

[75] Inventors: Hiroyuki Ohde; Noriyuki Kutsuwada, both of Kawasaki, Japan

[73] Assignee: Fujitsu Limited, Kawasaki, Japan

[21] Appl. No.: 275,924

[22] Filed: Jul. 14, 1994

Related U.S. Application Data

[63] Continuation of Ser. No. 950,078, Sep. 23, 1992, abandoned.

[30] Foreign Application Priority Data

Sep. 26, 1991 [JP] Japan ................................. 3-247429

[51] Int. Cl.⁶ ............................................. H04J 3/02
[52] U.S. Cl. ................................. 370/378; 370/466
[58] Field of Search ........................... 370/84, 60, 66, 370/67, 68.1, 58.1, 112, 79, 56, 68

[56] References Cited

U.S. PATENT DOCUMENTS

| | | | |
|---|---|---|---|
| 4,206,322 | 6/1980 | Lurtz | 370/66 |
| 4,512,014 | 4/1985 | Binz et al. | 370/68 |
| 4,713,804 | 12/1987 | Servel et al. | 370/68 |
| 4,922,485 | 5/1990 | Quinquis et al. | 370/60 |
| 4,941,141 | 7/1990 | Hayano | 370/58.1 |
| 5,123,012 | 6/1992 | Suzuki et al. | 370/66 |
| 5,130,979 | 7/1992 | Ohtawa | 370/67 |

*Primary Examiner*—Douglas W. Olms
*Assistant Examiner*—Chau T. Nguyen
*Attorney, Agent, or Firm*—Greer, Burns & Crain, Ltd.

[57] ABSTRACT

A time slot rearranging apparatus provided in a multiplexer in which a plurality of subscriber multiple signals transmitted through a subscriber line are converted into a primary rate multiple signal having a predetermined format. The time slot rearranging apparatus includes a format detecting circuit for detecting a type of format of the primary rate multiple signal, and an rearranging circuit for rearranging time slots of channels included in the plurality of subscriber multiple signals in accordance with the type of format detected by the format detecting circuit so that the primary rate multiple signal having the detected type of format is obtained.

8 Claims, 11 Drawing Sheets

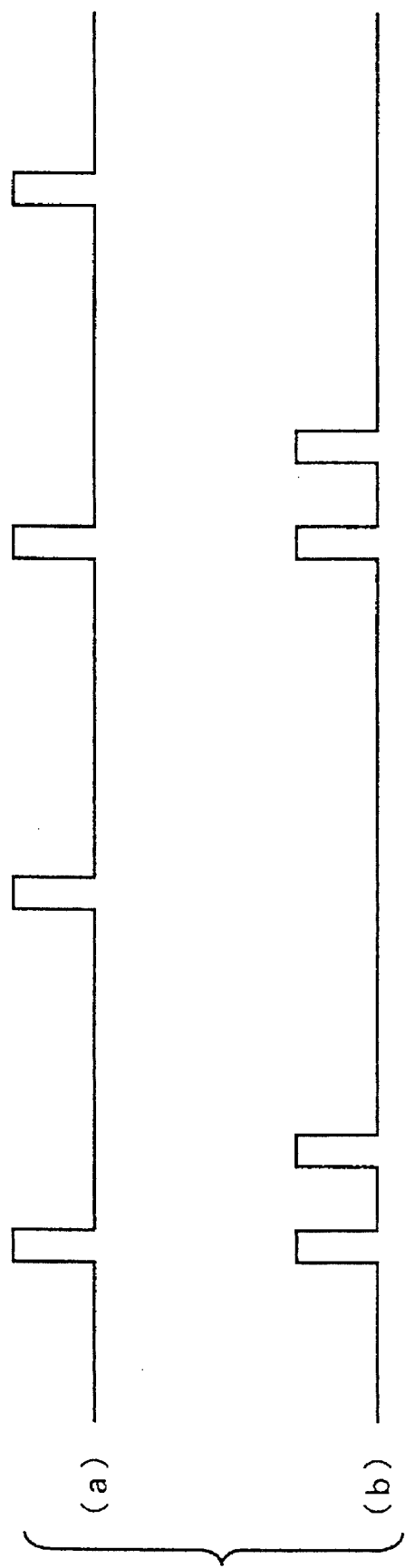

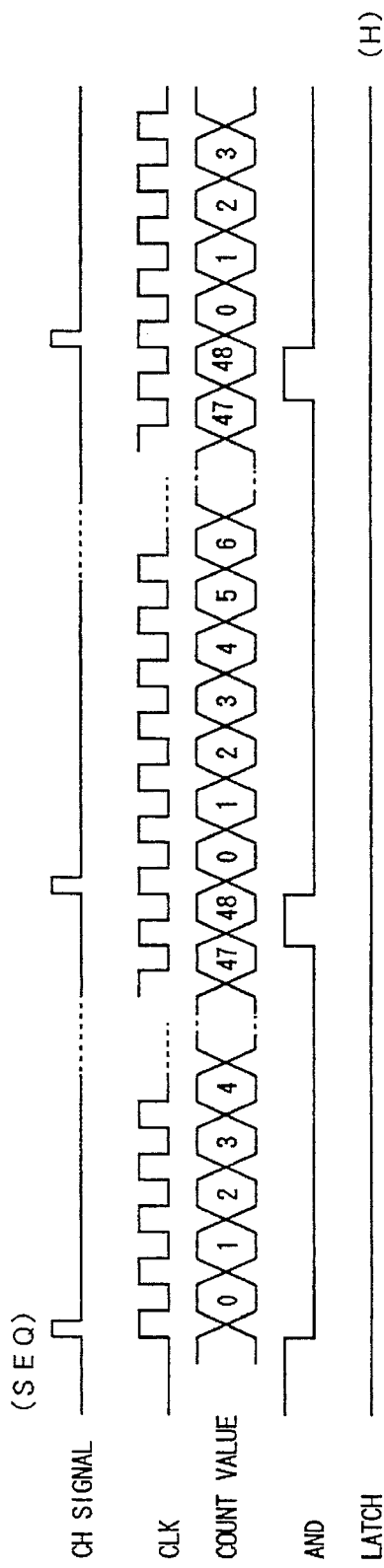
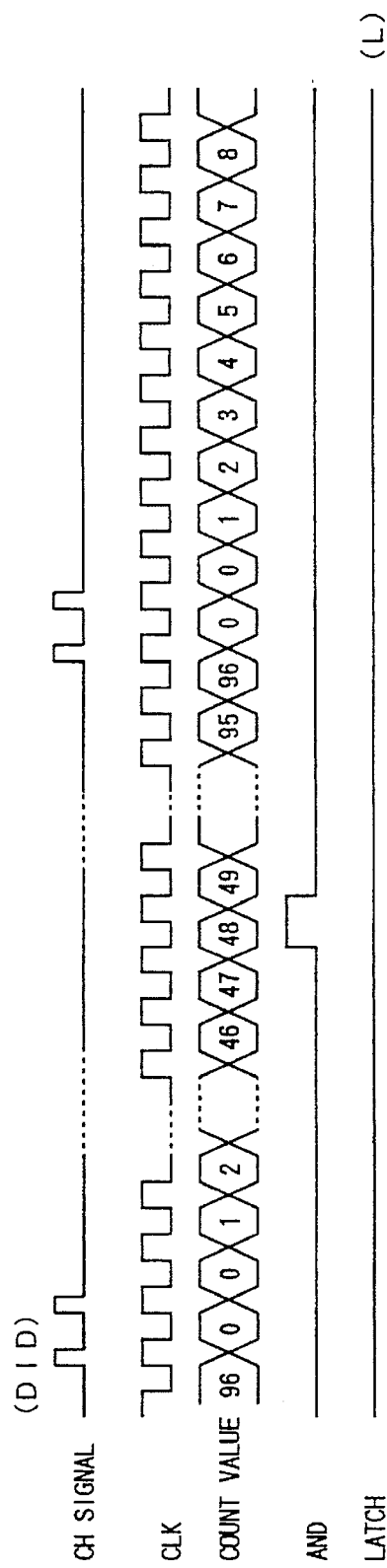

TIME SLOT REARRANGING APPARATUS IN MULTIPLEXER

This is a continuation of application Ser. No. 07/950,078, filed on Sep. 23, 1992, now abandoned.

BACKGROUND OF THE INVENTION (1) Field of the Invention

The present invention generally relates to a time slot rearranging apparatus in a multiplexer, and more particularly to a time slot rearranging apparatus in which time slots of multiple signals in an optical subscriber line are rearranged so that a primary rate signal has a predetermined format.

(2) Description of Related Art

Recently, a system has been proposed in which digital multiple subscriber signals, each having an original format, are transmitted to a remote terminal, such as an exchange, via optical fibers. In this system, as a multiple signal output from the remote terminal at the primary rate has to have a predetermined format, time slots of the multiple signals in an optical subscriber line (the optical fibers) must be rearranged so that the primary rate multiple signal has a predetermined format.

First, a conventional system in which analog signals in a subscriber line (a metal line) are multiplexed will be described below.

FIG. 1A shows a conventional system. In FIG. 1A, the system is provided with twelve channel boards 61 (#1–#12). Two subscriber lines are accommodated in each of the channel boards 61 via an input port 60, and each of the channel boards 61 has a coder 62 for converting analog signals to digital signals and a three state gate 63 capable of being in a high-impedance state. Each of the channel boards 61 is coupled to a multiplexer board 66 by a bus 64 and a channel identifying line 65. Subscriber signals supplied to each of the channel boards 61 are coded into digital data and supplied to the multiplexer board 66 via the bus 64. The channel boards 61 are controlled by channel identifying signals supplied from the multiplexer board 66 via the channel identifying lines 65.

A primary rate multiple signal output from the multiplexer board 66 has a format as shown in FIG. 1B (a). In FIG. 1B (a), one frame of the multiple signal is shared by 24 channels. A bit "F" positioned at a lead end of the frame is used for synchronizing. In a case where the multiple signal is formed of a plurality of frames (e.g. twelve frames or twenty four frames) which is referred to as a multi-frame signal, bits "F" of respective frames form a synchronizing pattern (e.g. 0101 . . . ). After the bit "F", signals of 24 channels, each having 8 bits, are successively arranged.

The multiplexer board 66 outputs the channel identifying signals as shown in FIG. 1B (b)–(e). The channel identifying signals are successively activated. Each time one of the channel identifying signals is activated, a corresponding channel board 61 outputs a multiple signal including two channels. The multiplexer 66 rearranges time slots of the multiple signals successively supplied from the channel boards 61 so that a primary rate multiple signal including twenty four channels is output from the multiplexer board 66.

The channel board 61 (#1) is, for example, shared by a first channel (CH1) and a thirteenth channel (CH13), the channel board 61 (#2) is shared by a second channel (CH2) and a fourteenth channel (CH14), and other channel boards 61 (#3–#12) are respectively shared by channels different from each other. A channel identifying signal supplied from the multiplexer board 66 to the channel board 61 (#1) is activated at time slots corresponding to the first and thirteenth channels. At a time slot corresponding to the first channel (CH1), one of the subscriber signals is input to the channel board 61 (#1) via the input port 60 and converted into a digital signal by the coder 62. The digital signal is then supplied to the bus 64, to which a pull-up resistor is connected, via the gate 63. After this, during time slots corresponding to the channels CH2 through CH12, the gate 63 of the channel board 61 (#1) is in the high-impedance state. At a time slot corresponding to the thirteenth channel CH13, another subscriber signal is input to the channel board 61 (#1) and converted into a digital signal. In the other channel boards 61, at time slots corresponding to channels sharing each of the channel boards 61, subscriber signals are converted into digital signals by the coder 62, and the digital signals are supplied to the bus 64. As a result, a multiple signal having the format as shown in FIG. 1B (a) is supplied to the multiplexer board 66 via the bus 64. The multiplexer board 66 adds the bit "F" to the multiple signal, generates a multi-frame multiple signal, and carries out other controls.

A primary rate multiple signal may have two types of formats. In the first format, channels are arranged in an order of CH1, CH2, CH3, . . . , CH24. In the second format, channels are arranged in an order of CH1, CH13, CH2, CH14, CH3, CH15, . . . , CH12, CH24. The first format and second format are respectively often referred to as a sequential format and a D1D format.

The conventional subscriber signals described above are analog signals. Next, a proposed system in which the subscriber line is formed of optical fibers will be describe below with reference to FIGS. 2A, 2B and 2C.

FIG. 2A shows a system in which the subscriber line is formed of optical fibers. In FIG. 2A, subscriber terminals 70 such as telephone sets and data processing terminals are provided in this system. Digital signals are output at a rate, for example, of 64 kbps from the subscriber terminals 70 and multiplexed. The multiple signal is transmitted to a remote station 72 via an optical subscriber line 71 at a rate, for example, of 1.5 Mbps. A multiple digital signal in the optical subscriber line 71 may have an original format. It is preferable that the format of the multiple digital signal in the optical subscriber line 71 be similar to the format of the primary rate signal. FIG. 2B shows an example of a format of a digital signal in the optical subscriber line. A bit "F" used for synchronizing is positioned at a lead end of the signal, and after the bit "F", channels CH1, CH2, . . . and CH12 are arranged. In this example, only a few channels are simultaneously used and all of the twenty four channels are not used. Thus, time slots corresponding to channels CH13–CH24 after the channel CH12 are used for other information (of controlling and checking). The subscriber signal is a multi-frame signal including twelve frames.

Time slots of the signals, as shown in FIG. 2B, in the optical subscriber lines are rearranged in the remote station 72 so that a primary rate multiple signal has a predetermined format. An example of the sequential format of the primary rate multiple signal is shown in FIG. 2C. In FIG. 2C, a multi-frame signal includes twelve or twenty four frames each frame being formed as shown in FIG. 1B (a). The D1D format is not shown in FIG. 2C.

In a case where time slots of digital signals in the optical subscriber lines connected to the remote station are rearranged so that a primary rate multiple signal has a predetermined format, the conventional system as shown in FIG.

1A is not used as it is, because the conventional system as shown in FIG. 1A multiplexes analog signals.

In addition, the primary rate multiple signal may have either the sequential format or the D1D format. The format of the primary rate multiple signal depends on the equipments installed in each remote station. Thus, a system for rearranging the time slots of the subscriber signals must be changed in accordance with the type of the format (the sequential format or the D1D format) of the primary rate signal.

SUMMARY OF THE INVENTION

Accordingly, a general object of the present invention is to provide a time slot rearranging apparatus in a multiplexer in which the disadvantages of the aforementioned prior art are eliminated.

A more specific object of the present invention is to provide a time slot rearranging apparatus in a multiplexer in which time slots of subscriber signals can be rearranged so that a primary rate multiple signal has a predetermined format.

Another object of the present invention is to provide a time slot rearranging apparatus in a multiplexer in which time slots of subscribe signals can be automatically rearranged in accordance with a type of format of a primary rate multiple signal.

The above objects of the present invention are achieved by a time slot rearranging apparatus in a multiplexer in which a plurality of subscriber multiple signals transmitted through a subscriber line are converted into a primary rate multiple signal having a predetermined format, the time slot rearranging apparatus comprising: format detecting means for detecting a type of format of the primary rate multiple signal; and rearranging means, coupled to the format detecting means, for rearranging time slots of channels included in the plurality of subscriber multiple signals in accordance with the type of format detected by the format detecting means so that the primary rate multiple signal having the detected type of format is obtained.

According to the present invention, as the time slots of the channels included in the subscriber multiple signals are rearranged in accordance with the type of detected format of the primary rate multiple signal, the time slots of subscriber signals can be automatically rearranged in accordance with a type of format of the primary rate multiple signal.

Additional objects, features and advantages of the present invention will become apparent from the following detailed description when read in conjunction with the accompanying drawings.

BRIEF DESCRIPTION OF THE DRAWINGS

FIG. 3B is a diagram illustrating channel signals respectively corresponding to a sequential format and a D1D format.

FIG. 5A is a timing chart illustrating operations of the format detection circuit when detecting a sequential format.

FIG. 5B is a timing chart illustrating operations of the format detection circuit when detecting a D1D format.

DESCRIPTION OF THE PREFERRED EMBODIMENTS

A description will now be given of a first embodiment of the present invention.

Figure 1A:
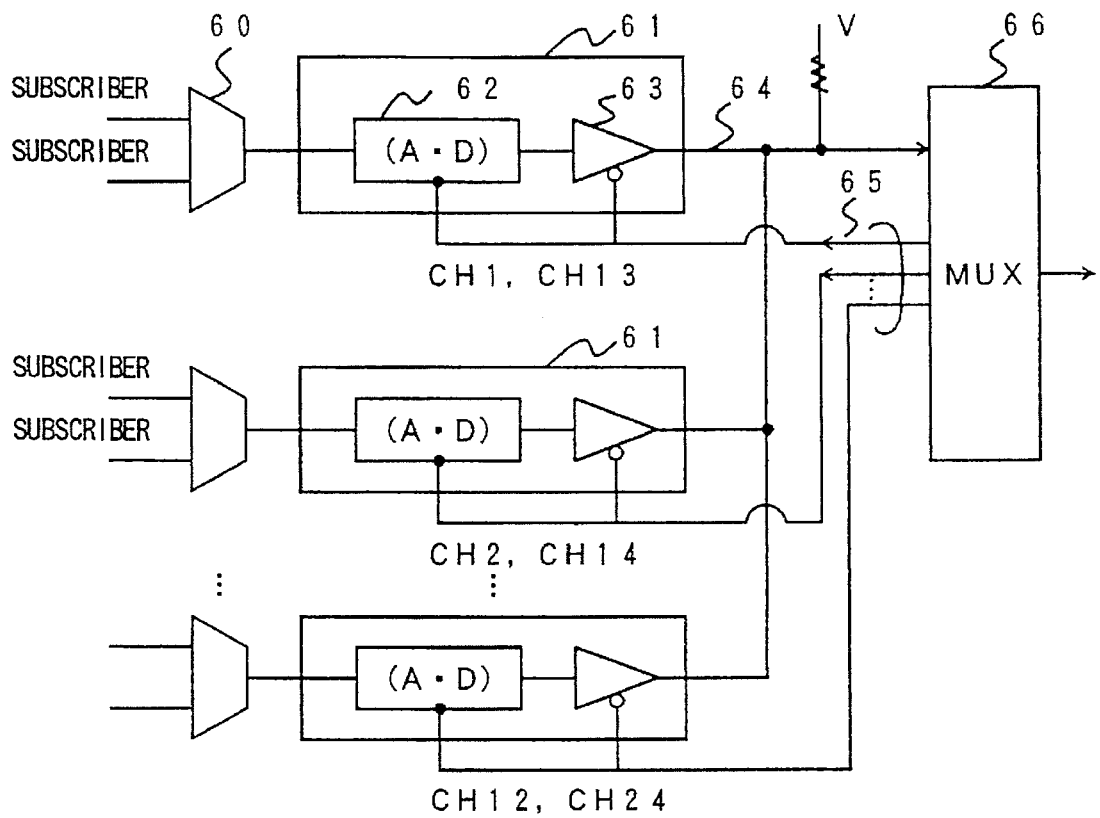
FIG. 1A is a block diagram illustrating a conventional system in which analog subscriber signals are multiplexed.
Figure 1B:
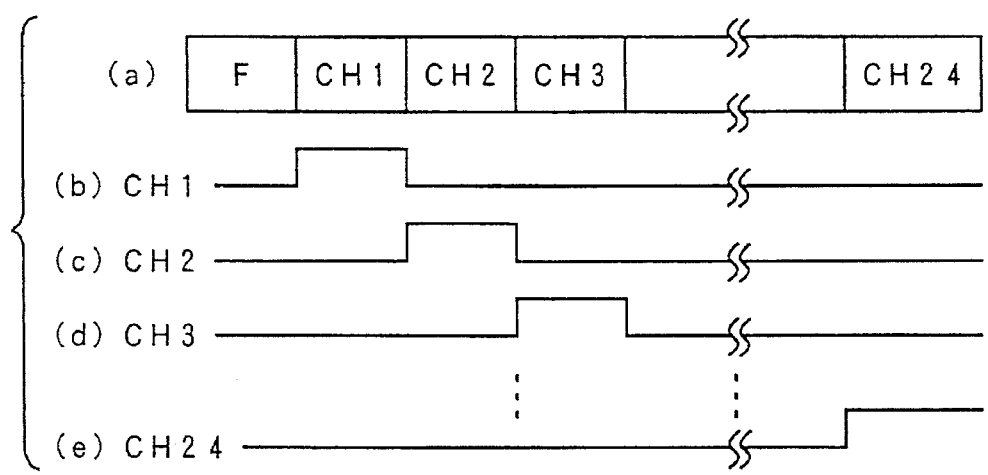
FIG. 1B is a diagram illustrating an example of a format of a primary rate multiple signal and channel identifying signals.
Figure 2A:
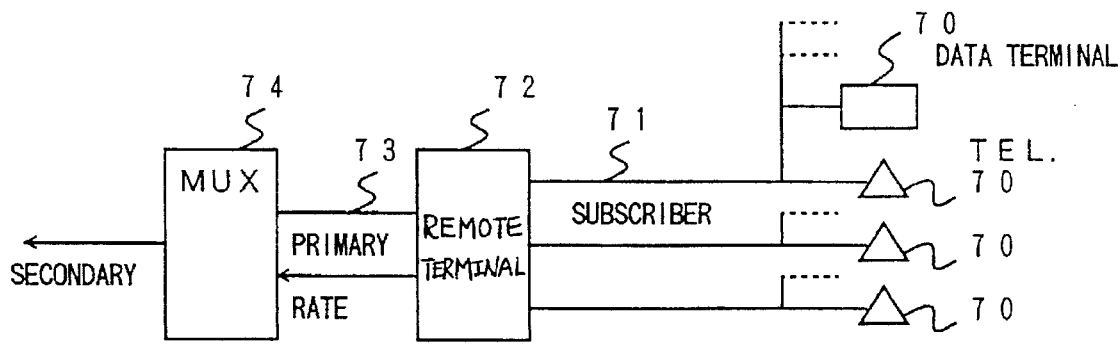
FIG. 2A is a block diagram illustrating a system in which optical subscriber lines connect subscriber terminals to a remote station.
Figure 2B:
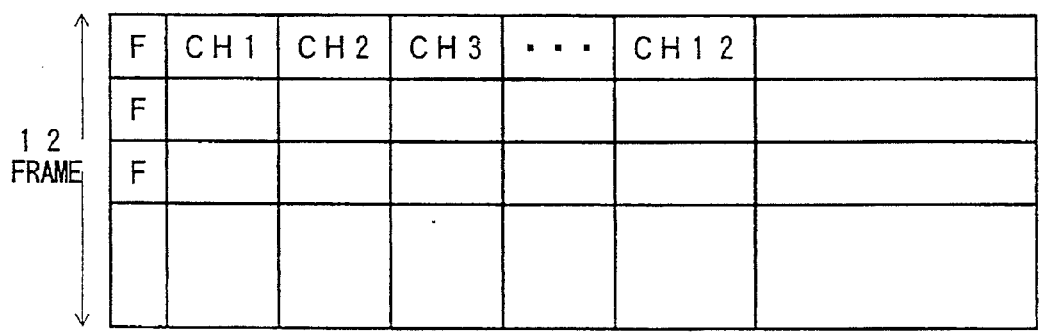
FIG. 2B is a diagram illustrating an example of a format of a subscriber signal.
Figure 3A:
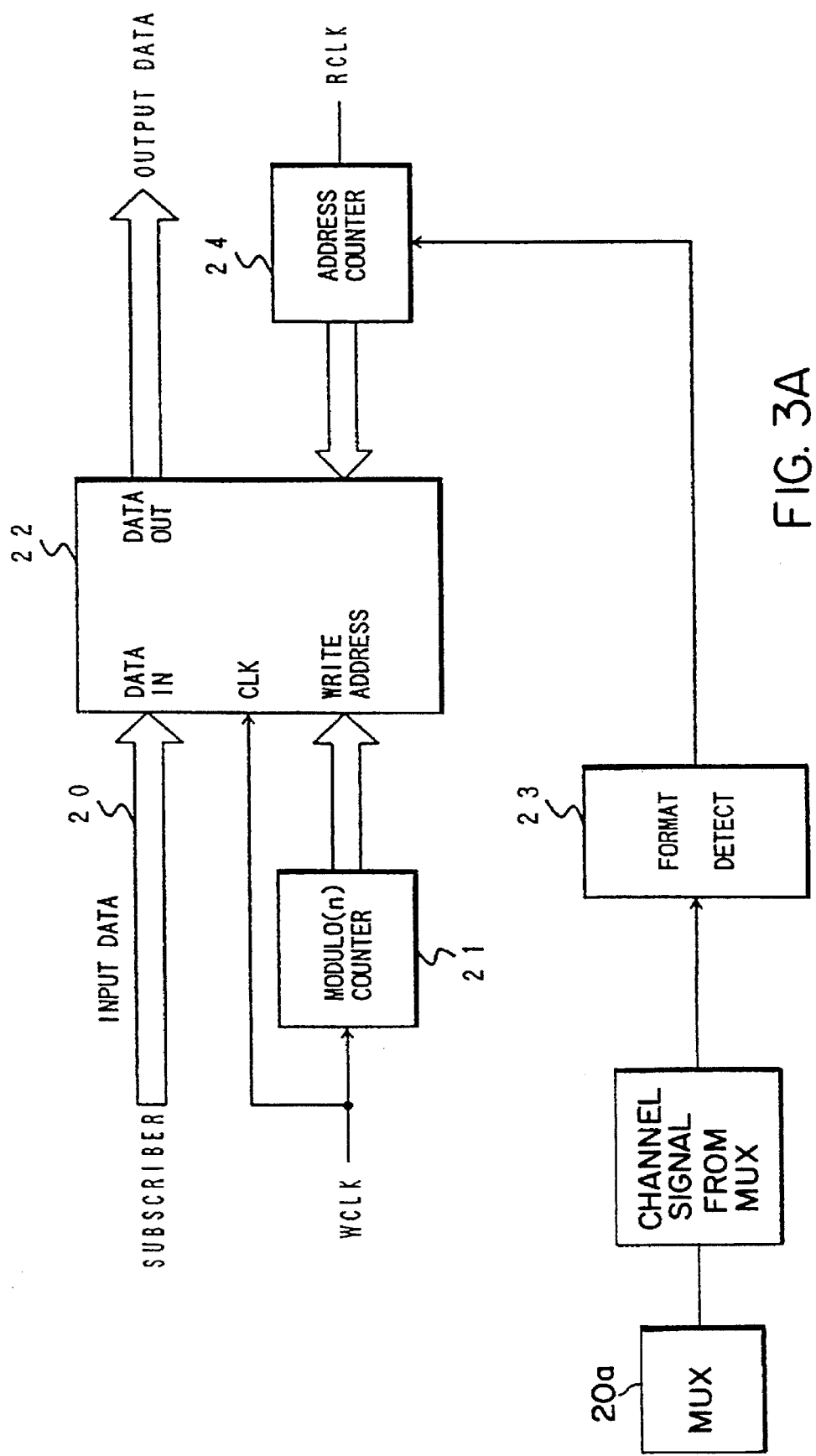
FIG. 3A is a block diagram illustrating a circuit unit of a time slot rearranging circuit according to a first embodiment of the present invention.

A time slot rearranging apparatus is installed in a remote station shown in FIG. 2A. The time slot rearranging apparatus is formed of a plurality of circuit units each corresponding to one channel board shown in FIG. 1A. FIG. 3A shows a circuit unit of the time slot rearranging apparatus. A plurality of digital subscriber signals (e.g. two digital subscriber signals) are transmitted from subscriber terminals to each circuit unit via an optical subscriber line. Referring to FIG. 3A, the digital subscriber signals are successively supplied, as input data 20, to a memory 22. A modulo n counter 21 counts a clock signal (WCLK) and supplies a count value, as a write address, to the memory 22. The memory 22 is operated in synchronism with the clock signal (WCLK). In a case where two subscriber signals are input to this circuit unit in the same manner as the above conventional case shown in FIG. 1A, a binary counter is used as the modulo n counter 21. A multiplexer 20a outputs a channel signal depending on a type of format of a primary rate signal. In a case where the format of the primary rate signal is the sequence format, a first channel signal as shown in FIG. 3B (a) is output from the multiplexer. In a case where the format of the primary rate signal is the D1D format, a second channel signal shown in FIG. 3B (b) is output from the multiplexer. A format detecting circuit 23 inputs the channel signal output from the multiplexer and detects the format of the primary rate multiple signal based on the channel signal. An address counter 24 is coupled to the memory 22 so that a count value of the address counter 24 is supplied, as a read address, to the memory 22. The address counter 24 carries out a count operation in synchronism with a clock signal (RCLK) in one of two modes. When the format detecting circuit 23 detects the sequential format, the address counter 24 carries out the count operation in a first mode. When the format detecting circuit 23 detects the D1D format, the address counter 24 carries out the count operation in a second mode. In the first mode, the count value of the address counter 24 successively increases one by one from "1". In the second mode, the count value of the address counter 24 varies so that the count value indicates a time slot corresponding to one of the channels which are successively changed in accordance with the D1D format (CH1, CH13, CH2, CH14, ..., CH12 and CH24).

The digital subscriber signals are successively supplied to the memory 22. The digital subscriber signals are written in addresses, of the memory 22, identified by the count value of the modulo n counter 21. When the format detecting circuit 23 detects that the format of the output multiple signal is the sequential format, the address counter 24 carries out a count operation in the first mode. Thus, the read address of the memory 22 increases one by one, and the subscriber signals are successively read out from the memory 22. As a result, the subscriber signals are arranged in the sequential format. That is, time slots of the subscriber signals are rearranged in the sequential format in the multiple signal. On the other hand, when the format detecting circuit 23 detects that the format of the output multiple signal is the D1D format, the address counter 24 carries out a count operation in the second mode. Thus, the read address of the memory 22 varies depending on the D1D format, and the subscriber signals are read out from the memory 22. As a result, the subscriber signals are arranged in the D1D format. That is, time slots of the subscriber signals are rearranged in the D1D format in the multiple signal.

Figure 4:
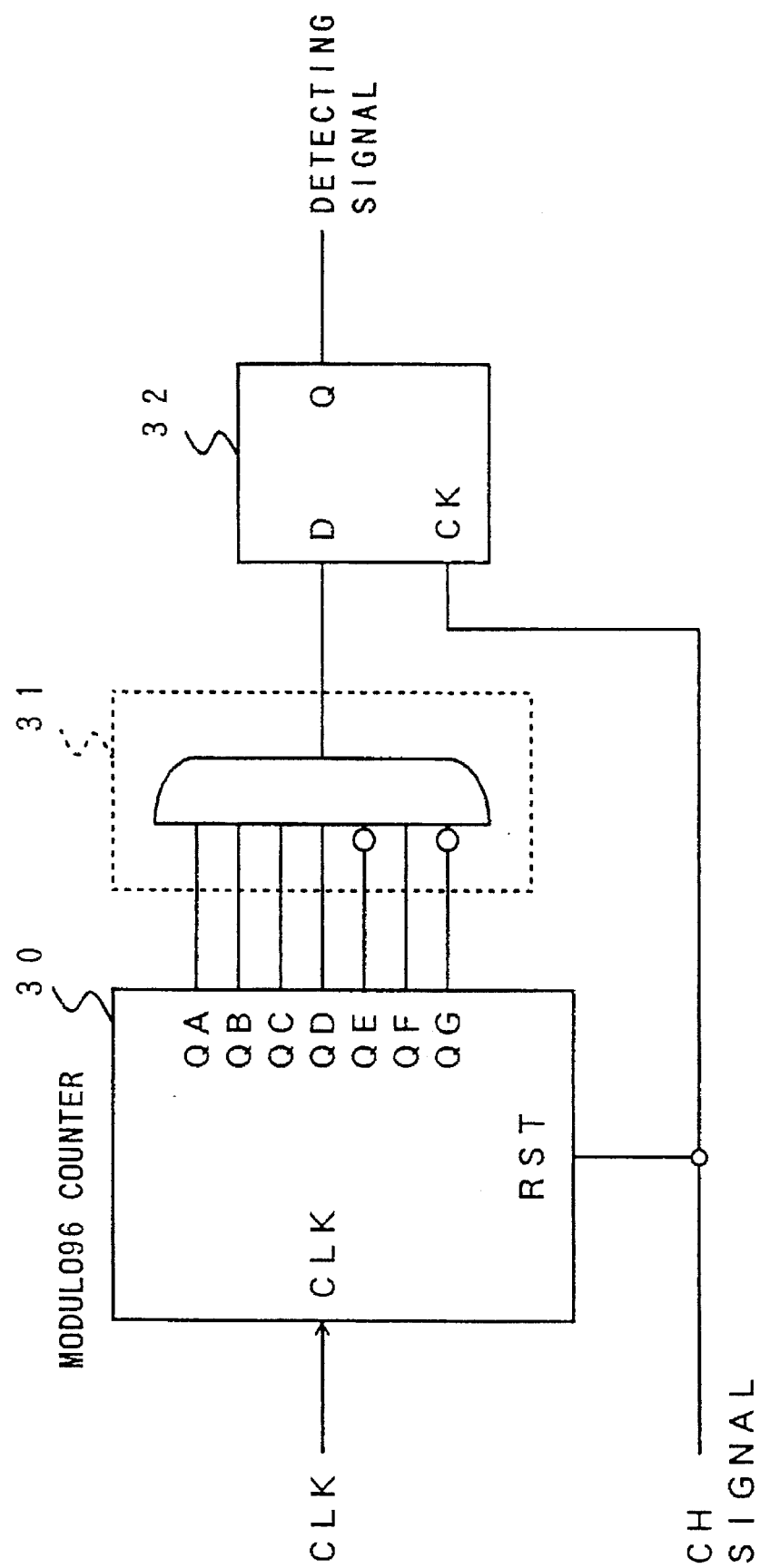
FIG. 4 is a circuit diagram illustrating a format detecting circuit provided in the circuit unit of the time slot rearranging circuit shown in FIG. 3A.

The format detecting circuit 23 is formed, for example, as shown in FIG. 4.

Referring to FIG. 4, a modulo 96 counter 30 having seven output terminals QA-QG carries out a count operation in synchronism with a predetermined clock signal (CLK). The modulo 96 counter 30 is reset by the channel signal as shown in FIG. 3B. The output terminals QA-QG are connected to an AND circuit 31. Bits of fifth and seventh output terminals QE and QG are inverted and input to the AND circuit 31, so that, when a count value of the modulo 96 counter 30 reaches "48", an output of the AND circuit 31 is activated. The output of the AND circuit 31 is connected to an input terminal (D) of a latch circuit 32. The channel signal is input to a clock terminal (CK) of the latch circuit 32 so that the latch circuit 32 latches an input state when the channel signal is activated.

In a case where the primary rate multiple signal has the sequential format, the format detecting circuit 23 operates as shown in FIG. 5A. Referring to FIG. 5A, the first channel signal, as shown in FIG. 3B (a), corresponding to the sequential format is activated on every 48-th pulse of the clock signal (CLK). Thus, every time the output of the AND circuit 31 is activated, the first channel signal is activated. As a result, an output (Q) of the latch circuit 32 is always maintained at a high level (active).

On the other hand, in a case where the primary rate multiple signal has the D1D format, the format detecting circuit 23 operates as shown in FIG. 5B. Referring to FIG. 5B, the second channel signal, as shown in FIG. 3B (b), corresponding to the D1D format is activated for two pulses on every 96-th pulse of the clock signal (CLK). Whenever the output of the AND circuit 31 is activated, the second channel signal is inactive. As a result, the output (Q) of the latch circuit 32 is always maintained at a low level (inactive).

Hence, when the primary rate multiple signal has the sequential format, the format detecting circuit 23 outputs a detecting signal having the high level. When the primary rate multiple signal has the DiD format, the format detecting circuit 23 outputs the detecting signal having the low level.

According to the first embodiment, the format detecting circuit 23 detects a type of format of the primary rate multiple signal, and the read address of the memory 22 is controlled based on the detection result of the format detecting circuit 23. Then the digital subscriber signals are read out from the memory 22 so as to be arranged in a detected format (the sequential format or the D1D format). Thus, time slots of signals in an optical subscriber line are rearranged so that a primary rate multiple signal has the detected format.

A description will now be given of a second embodiment of the present invention with reference to FIG. 6.

Figure 6:
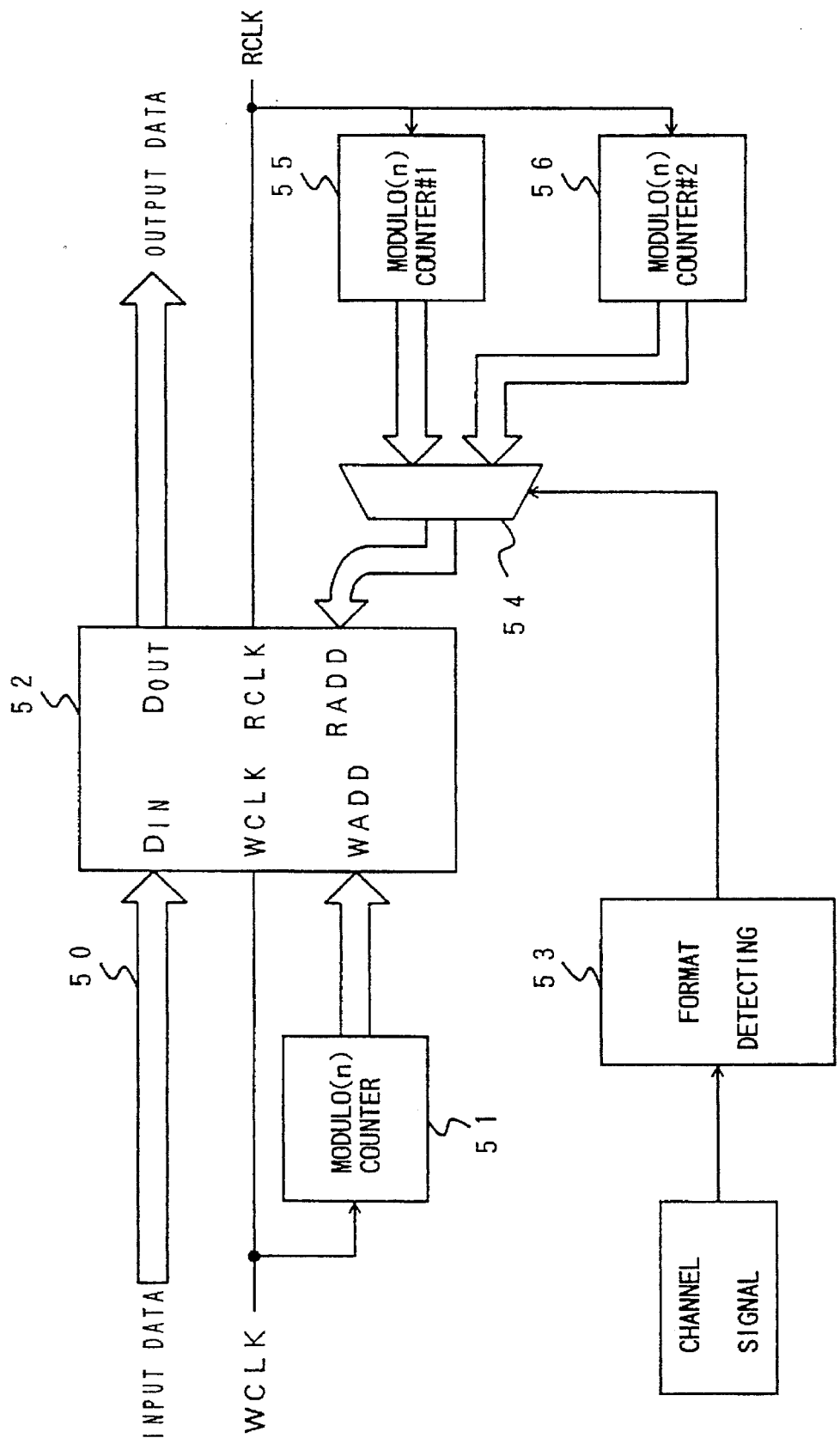
FIG. 6 is a block diagram illustrating a circuit unit of a time slot rearranging circuit according to a second embodiment of the present invention.

Referring to FIG. 6, the circuit unit has a memory 52, a modulo n counter 51 and a format detecting circuit 53 in the same manner as that shown in FIG. 1A. Further, a first address counter 55 (#1), a second address counter 56 (#2) and a selector 54 are substituted for the address counter 24 shown in FIG. 3A. The first address counter 55 successively increments a count value one by one in synchronism with a clock signal (RCLK). That is, the first address counter 55 (#1) carried out the count operation in the above first mode corresponding to the sequential format. The second address counter 56 (#2) carries out a count operation so that a count value thereof indicates a time slot corresponding to one of the channels which are successively changed in accordance with the D1D format (CH1, CH13, CH2, CH14, ..., CH12 and CH24). That is, the second address counter 56 (#2) carries out the count operation in the second mode described above. The format detecting circuit 53 is formed as shown in FIG. 4 in the same manner as the format detecting circuit provided in the circuit unit shown in FIG. 3A.

The digital subscriber signals are successively written in addresses, identified by the count value of the modulo n counter 51, of the memory 52. When the format detecting circuit 53 detects that the primary rate multiple signal has the sequential format, the selector 54 selects the first address counter 55 (#1) based on the detecting signal output from the format detecting circuit 53. In this case, the count value of the first address counter 55 (#1) is supplied, as the read address, to the memory 52. Thus, the digital signals read out from the memory 52 are successively arranged in the sequential format. On the other hand, when the format detecting circuit 53 detects that the primary rate multiple signal has the D1D format, the selector 54 selects the second address counter 56 (#2) based on the detecting signal output from the format detecting circuit 53. In this case, the count value of the second address counter 55 (#2) is supplied, as the read address, to the memory 52. Thus, the digital signals read out from the memory 52 are successively arranged in the D1D format.

A description will now be given of a third embodiment of the present invention with reference to FIGS. 7 through 10.

Figure 7:
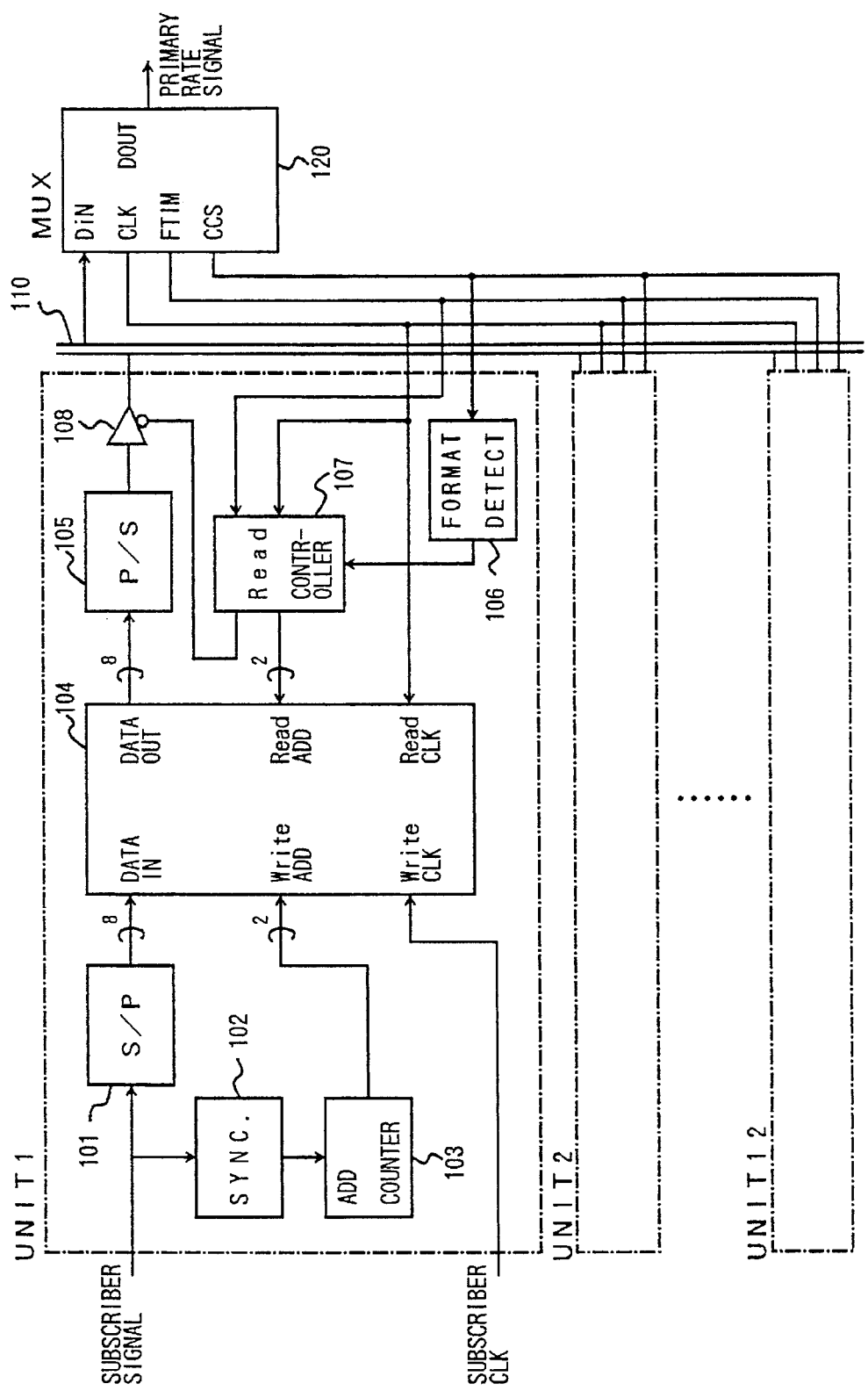
FIG. 7 is a block diagram illustrating a time slot rearranging circuit according to a third embodiment of the present invention.

FIG. 7 shows a time slot rearranging apparatus according to the third embodiment of the present invention. This time slot rearranging apparatus can include twelve circuit units (#1-#12). The constitutions of the circuit units (#1-#12) are all the same. Referring to FIG. 7, each of the circuit units has a serial-to-parallel converter 101, a synchronization detecting circuit 102, a write address counter 103, a memory 104, a parallel-to-serial converter 105, a format detecting circuit 106, a read controller 107 and a three-state gate 108. A subscriber multiple signal supplied to the circuit unit via the optical subscriber line includes, for example, four channels. A signal of each of the channels is converted into parallel data (e.g. 8 bits) by the serial-to-parallel converter 101. The data is supplied, as write data, to the memory 104. The subscriber multiple signal is supplied to the synchronization detecting circuit 102. The synchronization detecting circuit 102 detects the bit "F" positioned at the lead end of each frame of the subscriber multiple signal, and outputs a synchronous signal activated each time the bit "F" is detected. The write address counter 103 carries out a count operation in synchronism with the synchronous signal supplied from the synchronization detecting circuit 102. The count value of the write address counter 103 increments one by one and is supplied, as a write address, to the memory 104. A subscriber clock signal is supplied to the memory 104 so that the write operation of the memory 104 is carried out in synchronism with the subscriber clock signal. Output data from the memory 104 is converted into a serial signal by the parallel-to-serial converter 105, and the serial signal output therefrom is supplied to a data bus 110 via the three-state gate 108. The read controller 107 generates a read address and a gate control signal. The read address has, for example, two bits in a case where the subscriber multiple signal includes four channels. The control signal is supplied to the three-state gate 108. When the control signal is activated, the three-state gate 108 is in the high-impedance state.

A multiplexer 120 is coupled to the data bus 110. The multiplexer 120 successively inputs signals of respective channels from the data bus 110, and outputs a primary rate multiple signal having a predetermined format (either the sequential format or the D1D format). The bit "F" of the primary rate multiple signal is generated by the multiplexer 120. The multiplexer 120 supplies a clock signal, a timing signal (FTIM) and a channel signal to each of the circuit units. The clock signal is input to the memory 104 so that the read operation of the memory 104 is carried out in synchronism with the clock signal. The timing signal (FTIM) indicates a position of the bit "F" of the primary rate multiple signal. The timing signal (FTIM) and the clock signal are input to the read controller 107. The channel signal indicates a type of format (the sequential format or the D1D format) of the primary rate multiple signal output from the multiplexer 120 and is input to the format detecting circuit 106. The format detecting circuit 106 is formed as shown in FIG. 4 and operates as shown in FIGS. 5A and 5B. The format detecting circuit 106 outputs the detecting signal which is activated when the sequential format is detected. The read controller 107 generates the read address and the gate control signal in accordance with a state of the detecting signal supplied from the format detecting circuit 106.

Figure 8:
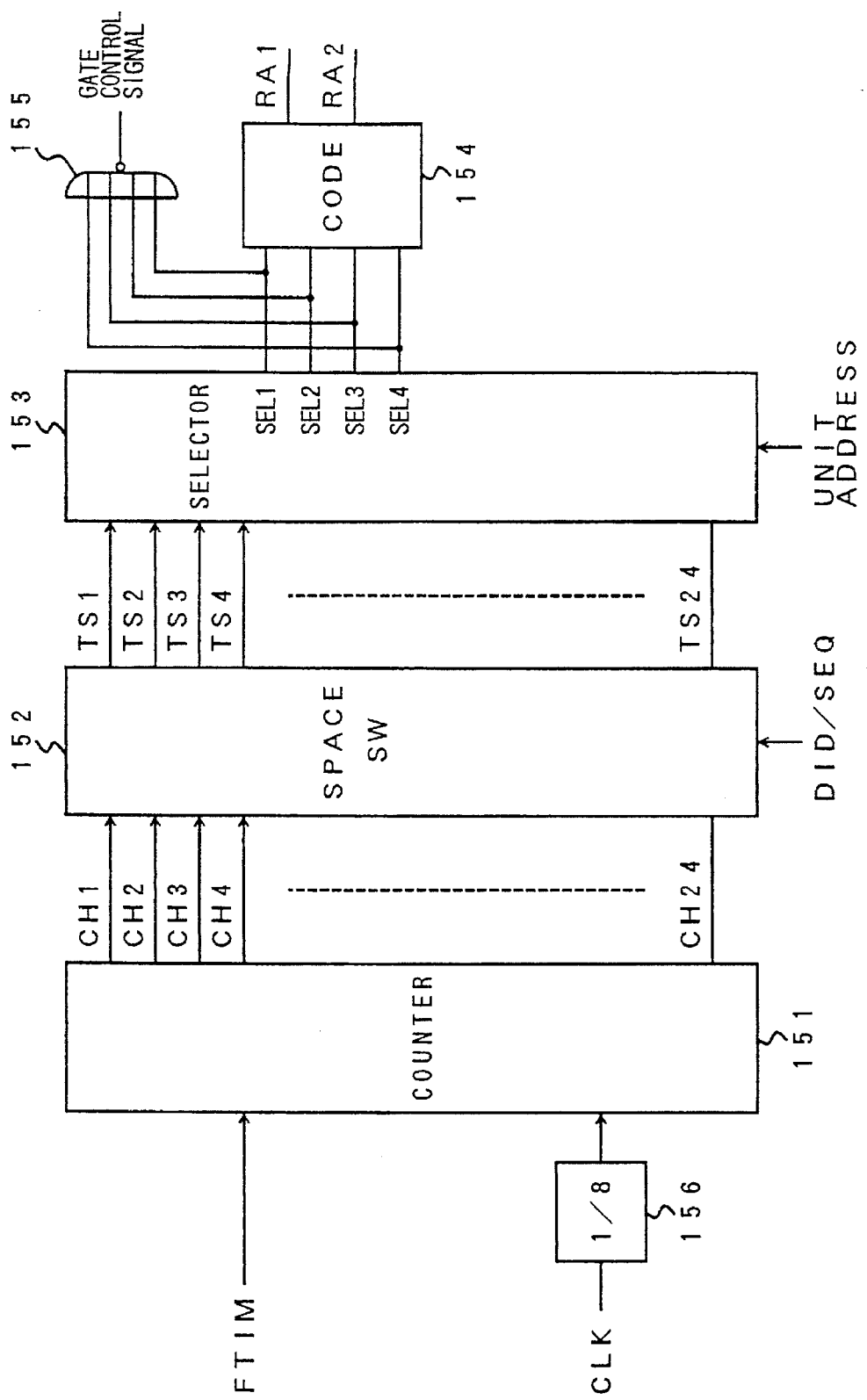
FIG. 8 is a block diagram illustrating a read control circuit provided in the time slot rearranging circuit shown in FIG. 7.

The read controller 107 is formed, for example, as shown in FIG. 8. Referring to FIG. 8, the read controller 107 has a counter 151, a space switch 152, a selector 153, a coder 154, a NAND gate 155 and a divider 156. The divider 156 divides the clock signal supplied from the multiplexer 120 into eighths and outputs a ⅛ clock. The counter 151 has twenty four output terminals corresponding to twenty four channels (CH1–CH24). The counter 151 operates in synchronism with the ⅛ clock so that the twenty four output terminals are activated in turn. The counter 151 is reset by the timing signal (FTIM). The output terminals of the counter 151 are connected to input terminals of the space switch 152 having twenty four output terminals corresponding to twenty four time slots (TS1–TS24). The space switch 152 switches connecting relationships between the input terminals and the output terminals based on the detecting signal (D1D/SEQ) supplied from the format detecting circuit 106. When the detecting signal has a high level (the sequential format is detected), the space switch 152 connects the input terminals to the output terminals so that channels CH1, CH2, ..., and CH24 respectively correspond to time slots TR1, TR2, ..., and TR24. When the detecting signal has a low level (the D1D format is detected), the space switch 152 connects the input terminals to the output terminals so that channels CH1, CH13, CH2, CH14, CH3, CH15, ..., CH12, and CH24 respectively correspond to time slots TR1, TR2, TR3, TR4, TR5, TR6, ..., TR23, and TR24. The output terminals of the space switch 152 are connected to input terminals of the selector 153 having four output terminals (SEL1–SEL4). The selector 153 selectively outputs four input signals from among twenty four signals input to the input terminals based on a unit address supplied from the multiplexer 120. The unit address indicates a circuit unit to be activated. In each of the circuit units (#1–#12), the selector outputs signals corresponding to four time slots as indicated in the following table.

TABLE 1

| CIRCUIT UNIT | SELECTOR | OUTPUTS | (SEL1–SEL4) | |
| --- | --- | --- | --- | --- |
| 1 | TS1, | TS2, | TS3, | TS4 |
| 2 | TS3, | TS4, | TS5, | TS6 |
| 3 | TS5, | TS6, | TS7, | TS8 |
| 4 | TS7, | TS8, | TS9, | TS10 |
| 5 | TS9, | TS10, | TS11, | TS12 |
| 6 | TS11, | TS12, | TS13, | TS14 |
| 7 | TS13, | TS14, | TS15, | TS16 |
| 8 | TS15, | 1S16, | TS17, | TS18 |
| 9 | TS17, | 1S18, | TS19, | TS20 |
| 10 | TS19, | TS20, | TS21, | TS22 |
| 11 | TS21, | TS22, | TS23, | TS24 |
| 12 | — | — | — | — |

In this case, the selector 152 of the circuit unit #12 outputs signals corresponding to arbitrary time slots.

The output terminals (SEL1–SEL4) of the selector 152 are connected to input terminals of the coder 154. The coder 154 outputs two bit data depending on input signal. The coder 154 outputs the two bit data (RA1, RA2) in accordance with the following table.

TABLE 2

| INPUT | | | | OUTPUT | | |
| --- | --- | --- | --- | --- | --- | --- |
| SEL1 | SEL2 | SEL3 | SEL4 | RA1 | RA2 | (ADDRESS) |
| H | L | L | L | L | L | "0" |
| L | H | L | L | H | L | "1" |
| L | L | H | L | L | H | "2" |
| L | L | L | H | H | H | "3" |

The output terminals (SEL1–SEL4) of the selector 152 are also connected to input terminals of the NAND gate 155. An output signal of the NAND gate 155 is supplied, as the gate control signal, to the three-state gate 108 shown in FIG. 7.

In the third embodiment, a subscriber signal supplied to each circuit unit via the optical subscriber line includes, for example, four channels. As one frame of the primary rate multiple signal includes twenty four channels, only six circuit units are activated in accordance with the unit address. In each of the circuit units, four channel data in the subscriber signal are written in the memory 104 in turn in the same manner as in the above described first embodiment.

Figure 9:
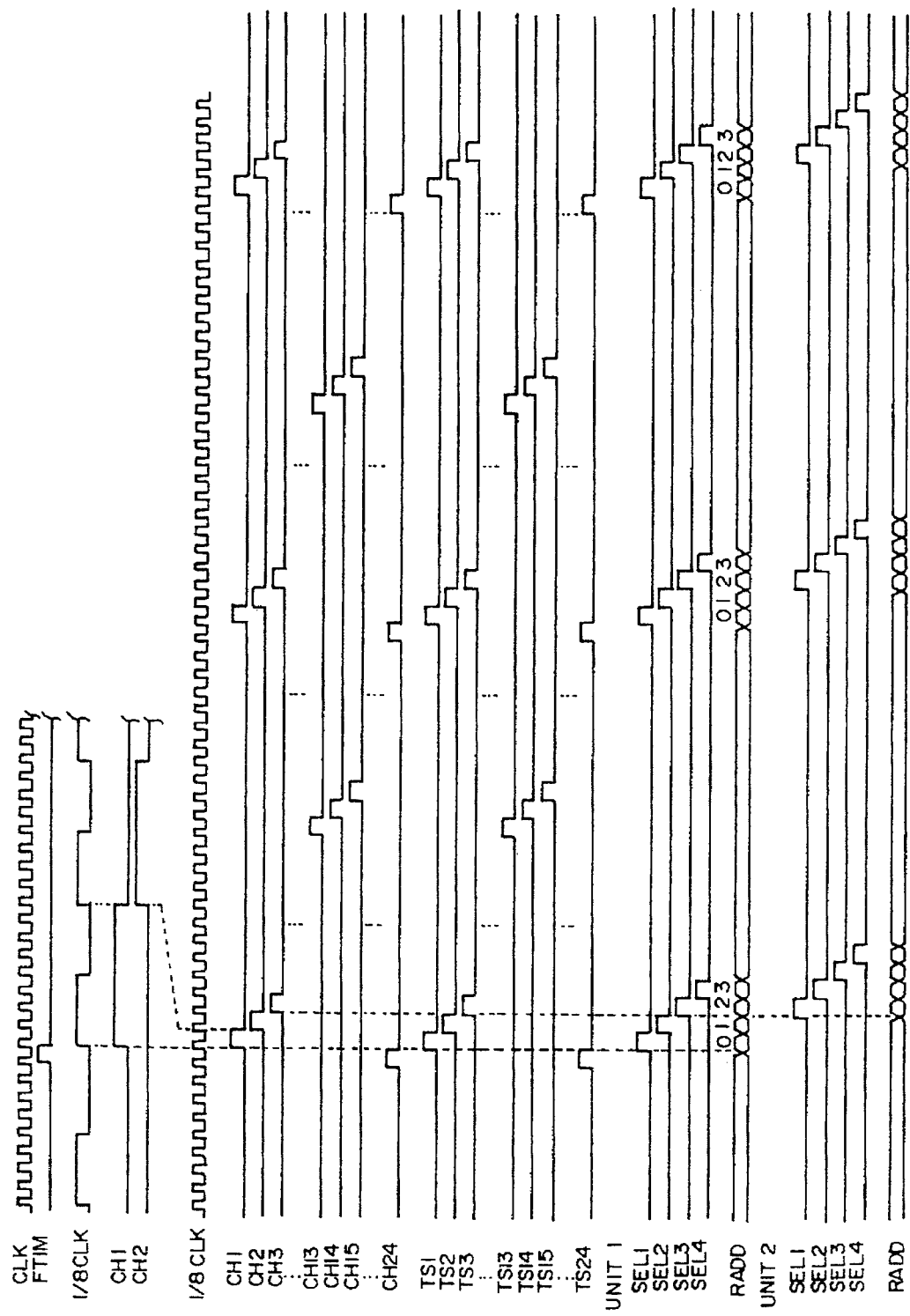
FIG. 9 is a timing chart illustrating operations of the read control circuit shown in FIG. 8 when a sequential format is detected by a format detecting circuit.

When the format detecting circuit 106 detects that the primary rate multiple signal has the sequential format, the read controller 107 operates as shown in FIG. 9. As a result, time slots of the subscriber signals supplied to the circuit units are rearranged so that the primary rate multiple signal having the sequential format is output from the multiplexer 120.

Referring to FIG. 9, the counter 158 operates in synchronism with the ⅛ clock so that the output terminals (CH1–CH24) are respectively activated in turn. The space switch 152 respectively connects the input terminals (CH1–CH24) to the output terminals (TS1–TS24) so as to correspond to the sequential format. Thus, the output terminals (TS1–TS24) of the space switch 152 are activated in the same manner as the output terminals (CH1–CH24) of the counter 151. In the circuit unit #1, while the outputs (TS1–TS4) of the space switch 152 are being activated in turn, the read address "0"(00), "1"(01), "2"(10), and "3"(11) are output from the read controller 107, in accordance with Table-2. The data stored in the memory 104 is then read out from the addresses "0", "1", "2" and "3" in turn. That is, the channels in the subscriber signal supplied to the circuit unit #1 are made to correspond to the time slots TS1, TS2, TS3 and TS4. While the other outputs (TS5–TS24) of the space switch 152 are being activated in turn, the outputs (SEL1–SEL4) of the selector 153 are at the low level. Thus, the output of the NAND gate 155 is at the high level. That is, the gate control signal is at the high level, so that the three-state gate 108 is in the high impedance state.

In the third embodiment, only six circuit units #1, #3, #5, #7, #9, and #11 are activated so that the time slots corresponding to respective circuit units are not overlapped (see Table-1). In the circuit unit #3, while the outputs (TS5–TS8) of the space switch 152 are being activated in turn, the data is read out from the addresses "0", "1", "2" and "3" of the memory 104. That is, four channels of the subscriber signal supplied to the circuit unit #3 are made to correspond to the time slots TS5, TS6, TS7, and TS8. Further, in the same manner as those described above, channels of the subscriber signals supplied to the circuit units #5, #7, #9 and #11 are respectively made to correspond to the time slots (TS9, TS10, TS11 and TS12), (TS13, TS14, TS15 and TS16), (TS17, TS18, TS19 and TS20), and (TS21, TS22, TS23 and TS24).

Figure 2C:
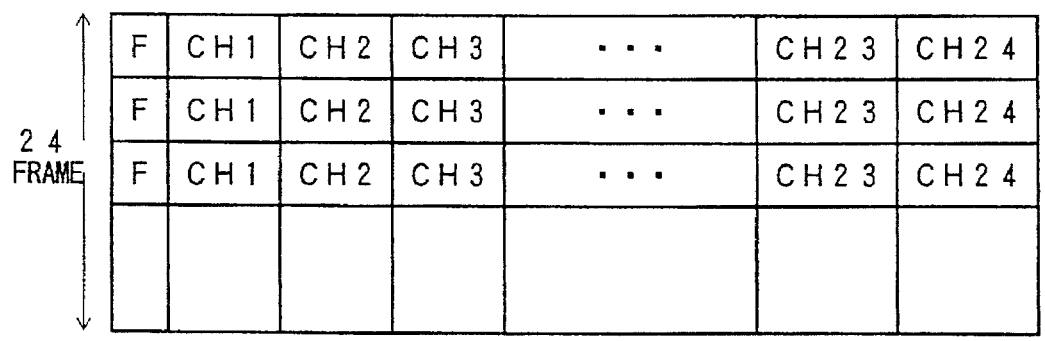
FIG. 2C is a diagram illustrating an example of a format of a primary rate multiple signal.

The multiplexer 120 inputs data successively supplied from the circuit units #1, #3, #5, #7, #9 and #11 to the data bus 110 and superposes them. As a result, the multiplexer 120 outputs a primary rate multiple signal having the sequential format as shown in FIG. 2C.

Figure 10:
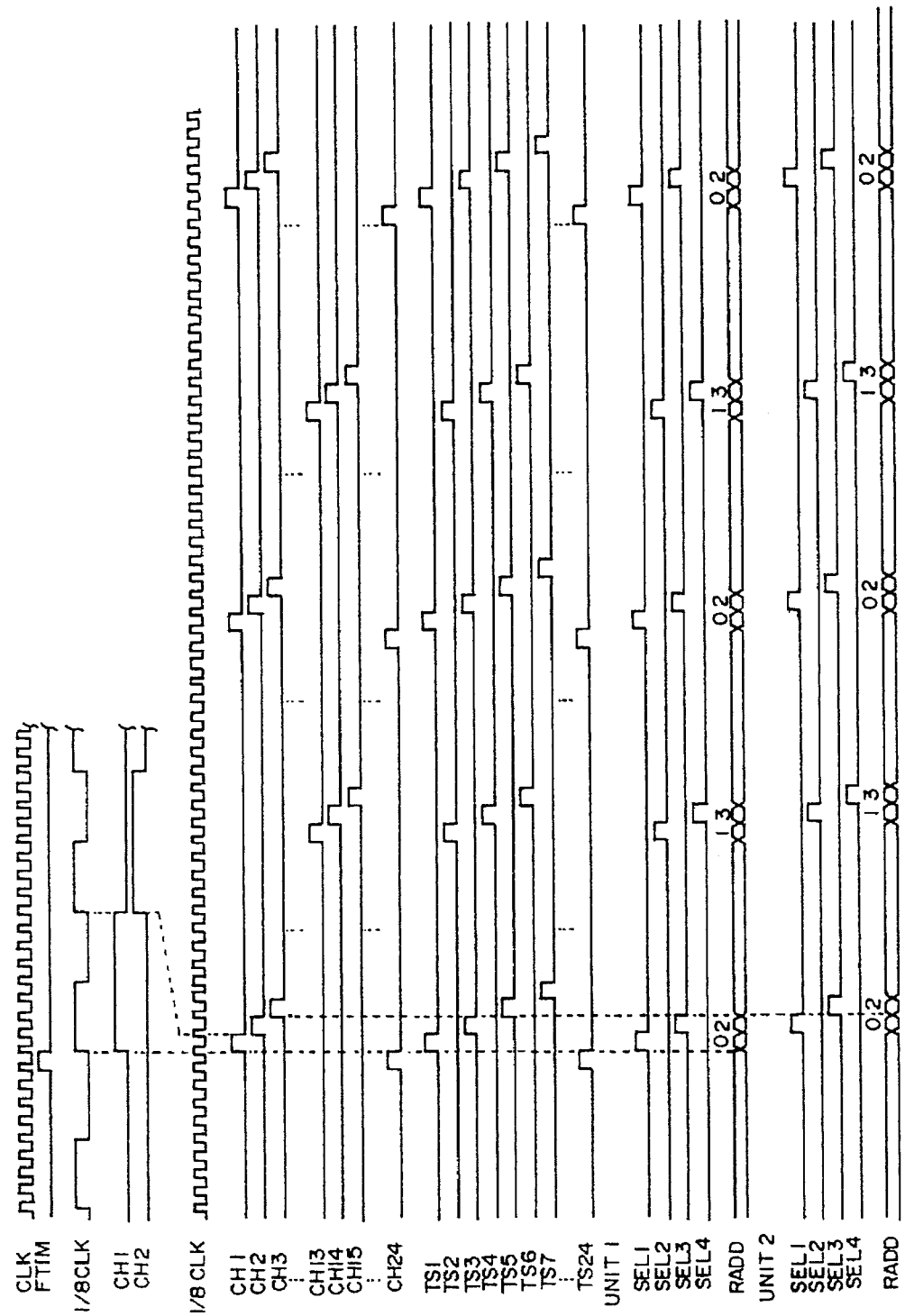
FIG. 10 is a timing chart illustrating operations of the read control circuit shown in FIG. 8 when a D1D format is detected by the format detecting circuit.

When the format detecting circuit 106 detects that the primary rate multiple signal has the D1D format, the read controller 107 operates as shown in FIG. 10. As a result, time slots of the subscriber signals supplied to the circuit units are rearranged so that the primary rate multiple signal having the D1D format is output from the multiplexer 120.

Referring to FIG. 10, the counter 151 operates in synchronism with the ⅛ clock so that the output terminals (CH1–CH24) are activated in turn. The space switch 152 respectively connects the input terminals CH1, CH13, CH2, CH14, CH3, CH15, . . . , CH12 and CH 24 to the output terminals TS1, TS2, TS3, TS4, TS5, TS6, . . . , TS23 and TS24 so as to correspond to the D1D format. Thus, when the outputs CH1–CH24 of the counter 151 are activated in turn, the outputs of the space switch 152 are activated in an order of TS1, TS3, TS5, TS7, . . . , TS19, TS21, TS23, TS2, TS4, TS6, . . . , TS22 and TS24. In the circuit unit #1, while the outputs TS1, TS3, TS2 and TS4 of the space switch 152 are being activated in turn, read addresses "0", "2", "1" and "3" are output from the read controller 107. The data stored in the memory 104 is then read out from the addresses "0", "2", "1" and "3" in turn. The circuit units #3, #5, #7, #9 and #11 then respectively output data to the data bus 110 when the outputs (TS5, TS7, TS6 and TS8), (TS9, TS11, TS10 and TS12), (TS13, TS15, TS14 and TS16), (TS17, TS19, TS18 and TS20), and (TS21, TS23, TS22 and TS24) of the space switch 152 are activated.

The multiplexer 120 inputs data successively supplied from the circuit units #1, #3, #5, #7, #9 and #11 to the data bus 110 and superposes them. As a result, the multiplexer 120 outputs a primary rate multiple signal having the D1D format.

According to the third embodiment, the read controller 107 outputs the read addresses in an order depending on the type of format (the sequential format or the D1D format) of the primary rate multiple signal. Thus, time slots of signals in an optical subscriber line are rearranged so that a primary rate multiple signal has the detected format.

The present invention is not limited to the aforementioned embodiments, and variations and modifications may be made without departing from the scope of the claimed invention.

What is claimed is:

1. A time slot rearranging apparatus, for use with a multiplexer, for converting a plurality of subscriber signals transmitted through at least one subscriber line into a primary rate multiple signal having a predetermined format of a plurality of channels corresponding to the plurality of subscriber signals, said time slot rearranging apparatus comprising:

format detecting means for receiving a channel signal from the multiplexer and for detecting a type of format that the plurality of subscriber signals must be converted into to produce said predetermined format of the primary rate multiple signal; and rearranging means, responsive to said format detecting means, for accepting said plurality of subscriber signals as an input and rearranging time slots corresponding to channels included in said plurality of subscriber signals in accordance with the type of format detected by said format detecting means so that the primary rate multiple signal having the predetermined type of format is obtained.

2. A time slot rearranging apparatus as claimed in claim 1, wherein said rearranging means comprises:

a memory;

write means for successively writing data of the channels included in said plurality of subscriber signals in said memory; and read means for reading out the data written by said write means from said memory in an order depending on the type of format detected by said format detecting means, so that the time slots of the channels are rearranged in accordance with the type of format detected by said format detecting means.

3. A time slot rearranging apparatus as claimed in claim 1, wherein the predetermined format of the primary rate multiple signal includes a first format, a second format or both the first and the second formats, and wherein said format detecting means comprises:

signal output means for outputting said channel signal as a first pulse signal having a first pattern when the primary rate multiple signal has the first format and for outputting said channel signal as a second pulse signal having a second pattern when the primary rate multiple signal has the second format;

signal detecting means, coupled to said signal output means, for detecting whether a signal output from said signal output means is the first signal or the second signal.

4. A time slot rearranging apparatus as claimed in claim 3, wherein said signal detecting means comprises:

pattern detecting means, coupled to said signal output means, for detecting whether a pattern of a signal output from said signal output means is the first pattern or the second pattern; and detecting signal generating means for generating a detecting signal, said detecting signal being at a first level when said pattern detecting means detects the first pattern, and said detecting signal being at a second level when said pattern detecting means detects the second pattern.

5. A time slot rearranging apparatus as claimed in claim 2, wherein the primary rate multiple signal includes a first format, a second format, or both the first and the second formats, and wherein said read means comprises:

first address counter means for selecting addresses in an order depending on the first format;

second address counter means for selecting addresses in an order depending on the second format; and selector means for selecting said first address counter means or said second address counter means in accordance with whether said format detecting means detects the first format or the second format, so that addresses are supplied from said address counter means selected by said selector means to said memory.

6. A time slot rearranging apparatus as claimed in claim 2, said read means comprising:

signal generating means for generating channel signals corresponding to the channels included in said plurality of subscriber signals;

signal rearranging means for rearranging an order in which the channel signals are generated by said signal generating means in accordance with the type of format detected by said format detecting means; and read address generating means for generating read addresses corresponding to activated channel signals supplied from said signal rearranging means, so that the read addresses are supplied from said read address generating means to said memory.

7. A time slot rearranging apparatus, for use with a multiplexer, for converting of subscriber multiple signals transmitted through at least one subscriber line into a primary rate multiple signal having a predetermined format of a plurality of channels corresponding to the plurality of subscriber multiple signals, said time slot rearranging apparatus comprising:

format detecting means for receiving a channel signal from the multiplexer and for detecting a type of format of the primary rate multiple signal; and rearranging means, responsive to said format detecting means, for accepting said plurality of subscriber multiple signals as an input and rearranging time slots of channels included in said plurality of subscriber multiple signals in accordance with the type of format detected by said format detecting means so that the primary rate multiple signal having the predetermined type of format is obtained;

said rearranging means including:

a memory;

write means for successively writing data of the channels included in said plurality of subscriber multiple signals in said memory; and read means for reading out the data written by said write means from said memory in an order depending on the type of format detected by said format detecting means, so that the time slots of the channels are rearranged in accordance with the type of format detected by said format detecting means;

said read means including:

signal generating means for generating channel signals corresponding to the channels included in said plurality of subscriber multiple signals;

signal rearranging means for rearranging an order in which the channel signals are generated by said signal generating means in accordance with the type of format detected by said format detecting means; and read address generating means for generating read addresses corresponding to activated channel signals supplied from said signal rearranging means, so that the read addresses are supplied from said read address generating means to said memory;

said signal rearranging means including a space switch having input terminals to which the channel signals are input, and output terminals each of which is connected to one of said input terminals, said space switch changing the correspondence between the output terminals and the input terminals in accordance with the type of the format detected by said format detecting means, and wherein the channel signals output through the output terminals of said space switch are supplied to said read address generating means.

8. A time slot rearranging apparatus, for use with a multiplexer, for converting a plurality of subscriber multiple signals transmitted through at least one subscriber line into a primary rate multiple signal having a predetermined format of a plurality of channels corresponding to the plurality of subscriber multiple signals, said time slot rearranging apparatus comprising:

format detecting means for receiving a channel signal from the multiplexer and for detecting a type of format of the primary rate multiple signal; and rearranging means, responsive to said format detecting means, for accepting said plurality of subscriber multiple signals as an input and rearranging time slots of channels included in said plurality of subscriber multiple signals in accordance with the type of format detected by said format detecting means so that the primary rate multiple signal having the predetermined type of format is obtained;

said rearranging means including:

a memory;

write means for successively writing data of the channels included in said plurality of subscriber multiple signals in said memory; and read means for reading out the data written by said write means from said memory in an order depending on the type of format detected by said format detecting means, so that the time slots of the channels are rearranged in accordance with the type of format detected by said format detecting means;

said read means including:

signal generating means for generating channel signals corresponding to the channels included in said plurality of subscriber multiple signals;

signal rearranging means for rearranging an order in which the channel signals are generated by said signal generating means in accordance with the type of format detected by said format detecting means; and read address generating means for generating read addresses corresponding to activated channel signals supplied from said signal rearranging means, so that the read addresses are supplied from said read address generating means to said memory;

said read address generating means including a coder to which the channel signals are supplied from said signal rearranging means, said coder outputting coded data corresponding to channel signals input thereto, the coded data being supplied, as the read addresses, to the memory.

* * * * *

UNITED STATES PATENT AND TRADEMARK OFFICE
CERTIFICATE OF CORRECTION

PATENT NO. : 5,629,939
DATED : May 13, 1997
INVENTOR(S) : Ohde et al.

It is certified that error appears in the above-indentified patent and that said Letters Patent is hereby corrected as shown below:

Column 2, line 32 delete "describe" and insert --described-- therefor..

Column 4, line 49, after "20a", insert --(MUX)--.

Column 4, line 53, after "multiplexer", insert --20a--.

Column 4, line 56, after "multiplexer", insert --20a--.

Column 4, line 57, after "multiplexer", insert --20a--.

Signed and Sealed this

Twenty-fifth Day of August, 1998

Attest:

Attesting Officer

BRUCE LEHMAN

Commissioner of Patents and Trademarks